United States Patent [19]
Olson et al.

[11] Patent Number: 5,095,467
[45] Date of Patent: Mar. 10, 1992

[54] TARGET TRACKING SYSTEM FOR DETERMINING BEARING OF A TARGET

[75] Inventors: David P. Olson, Mound; Jonathan C. Werder, Maple Grove, both of Minn.

[73] Assignee: Alliant Techsystems Inc., Edina, Minn.

[21] Appl. No.: 582,571

[22] Filed: Sep. 14, 1990

[51] Int. Cl.⁵ ............................................. G01S 3/80
[52] U.S. Cl. ............................................. 367/125
[58] Field of Search ............... 367/118, 124, 125, 127, 367/129, 122; 364/517

[56] References Cited

U.S. PATENT DOCUMENTS 4,914,642  4/1990  Fraser et al. .................... 367/122

OTHER PUBLICATIONS

*Acoustic Tracking of Ground Vehicles*, D. J. Shazeer et al., pp. 170-175, The Symposium on Ground Vehicle Signatures, Aug. 19-21, 1986, published by Keweenaw Research Center, Michigan Technological University, Houghton, Mich.

*Primary Examiner*—Daniel T. Pihulic
*Attorney, Agent, or Firm*—Merchant, Gould Smith, Edell, Welter & Schmidt

[57] ABSTRACT

A passive acoustic target tracking system includes three microphones arrayed respectively at corners of an equilateral triangle for sensing acoustic energy emitted by a target, such as a heavy vehicle, and generating separate streams of analog signals representative of the acoustic energy sensed at the triangle corners. Hardware of the tracking system receives the separate streams of analog signals from the microphones and conditions and converts the separate streams of analog signals from analog to digital form and outputs the separate streams as digital signals. Software of the tracking system receives the separate streams of digital signals and provides the bearing to the target emitting the sensed acoustic energy. The software includes a minimum residual correlation algorithm and a two-state kalman filter algorithm. The minimum residual correlation algorithm receives the separate streams of digital signals, performs correlations on the separate streams from pairs of the microphones, and produces a raw azimuth signal as a result of the correlation. The two-state kalman filter algorithm receives the raw azimuth signal, performs a two-state kalman filtering of the raw azimuth signal, and produces a smooth azimuth signal constituting the bearing to the target emitting the sensed acoustic energy.

23 Claims, 13 Drawing Sheets

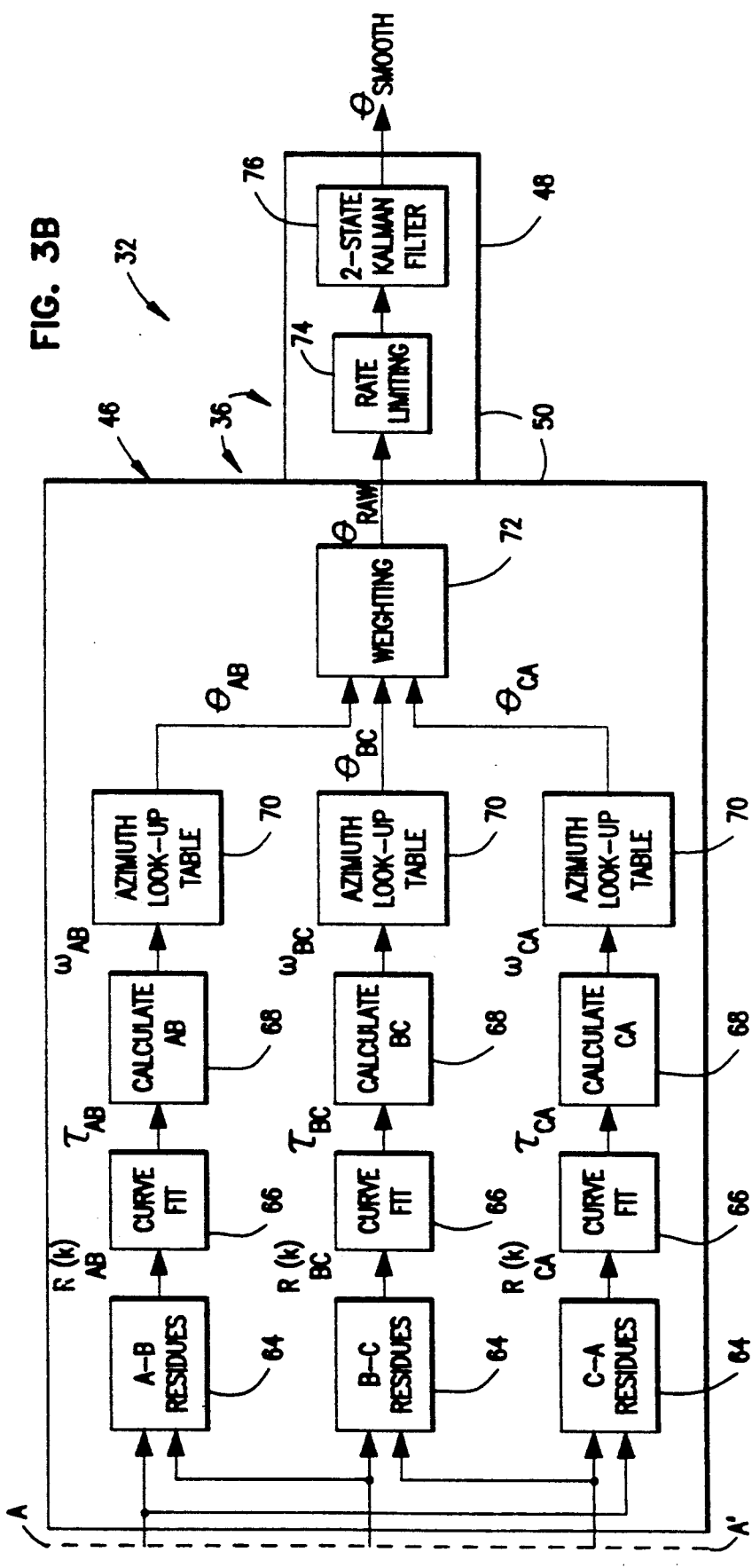

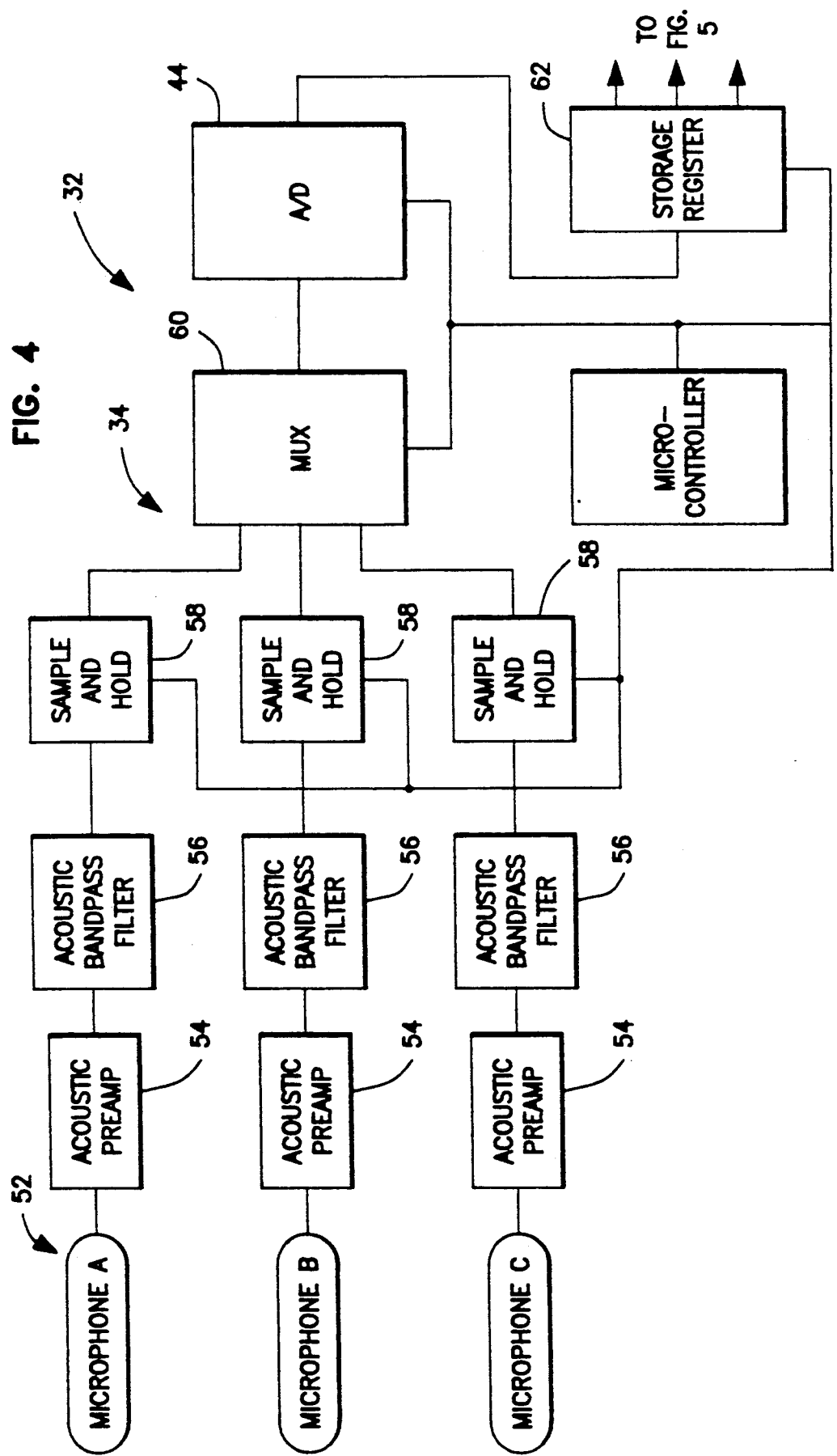

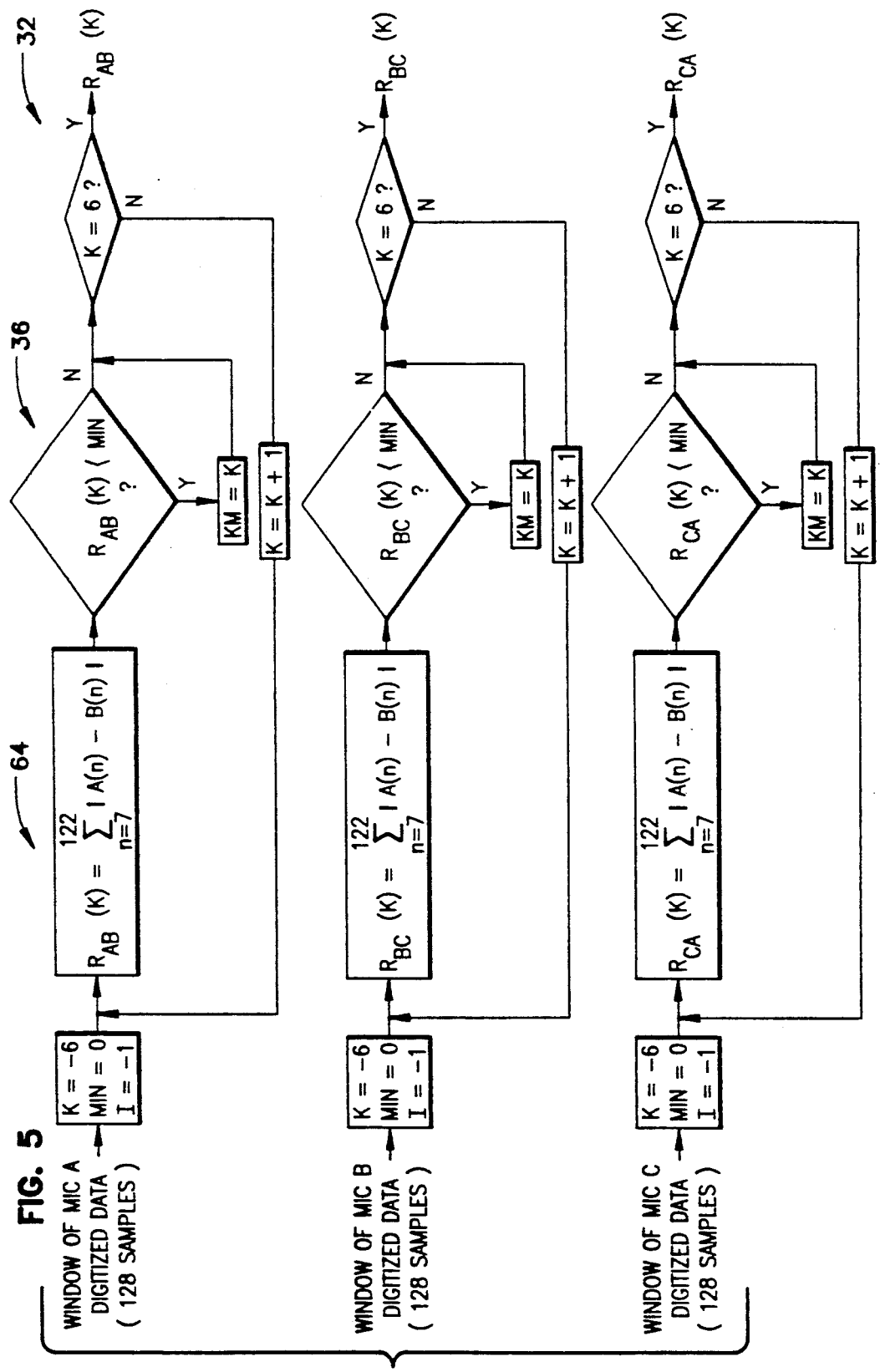

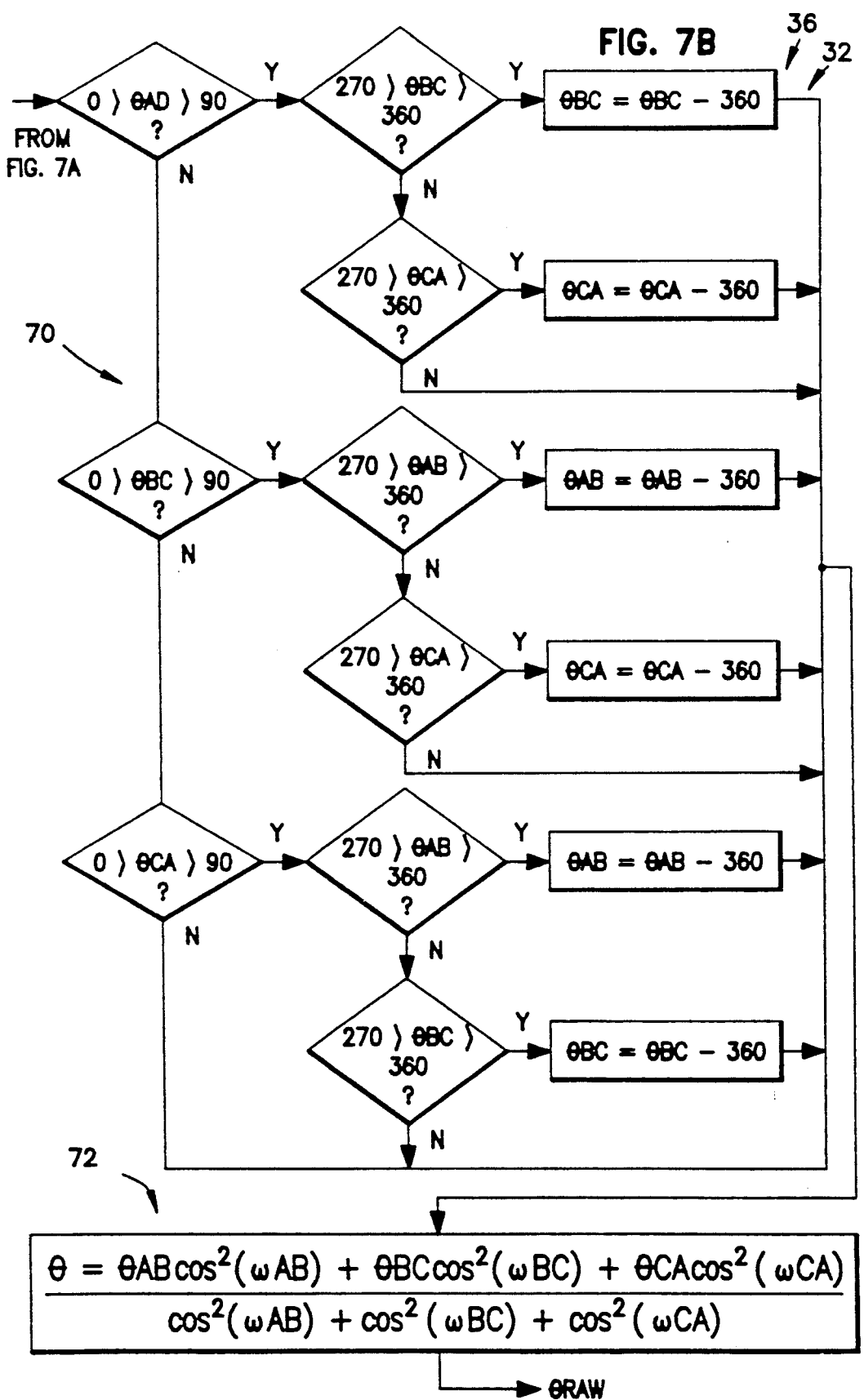

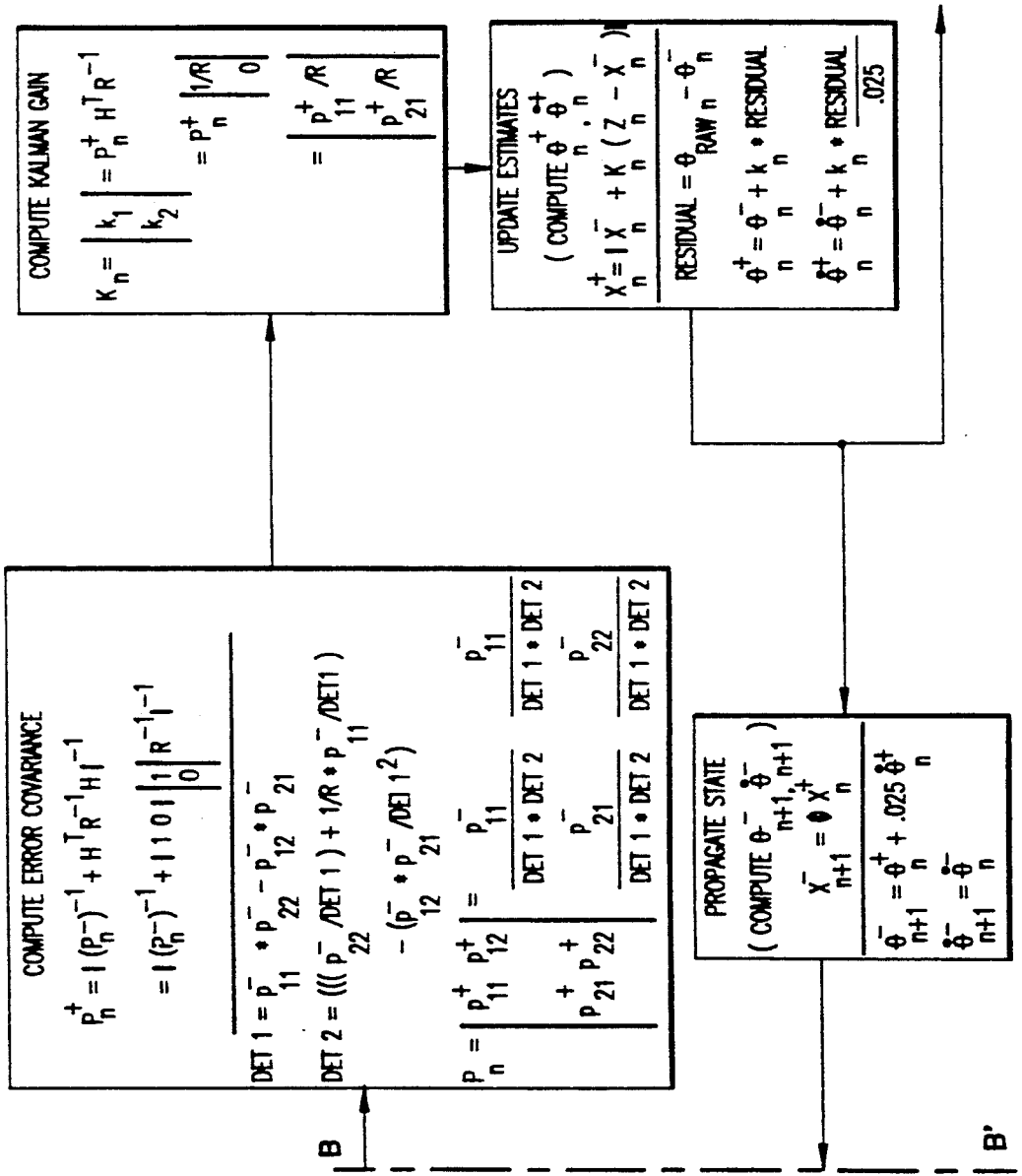

TARGET TRACKING SYSTEM FOR DETERMINING BEARING OF A TARGET

CROSS REFERENCE TO RELATED APPLICATION

Reference is hereby made to the following copending U.S. patent application dealing with related subject matter and assigned to the assignee of the present invention: "Target Engagement System For Determining Range Of A Target", assigned U.S. Ser. No. 07/582,574 and filed Sept. 14, 1990 now U.S. Pat. No. 5,067,096.

BACKGROUND OF THE INVENTION

1. Field of the Invention

The present invention generally relates to target tracking and engagement techniques for achieving accurate launching of a submunition and, more particularly, is concerned with a target tracking system for determining the bearing to a ground object emitting acoustic energy.

2. Description of the Prior Art

A wide area mine (WAM) submunition is currently being developed for the U.S. military. The WAM (also termed a "smart" mine) submunition basically includes a noise sensor that can detect sounds, or an acoustic signature, of a moving target, a launcher tube containing a sublet, a positioning mechanism for aiming the launcher tube, and an arming and firing mechanism for launching the sublet from the launcher tube.

The WAM submunition is initially deployed in a target area in a laid down position on the ground. A self-righting mechanism of the WAM submunition is used to erect the launcher tube from the laid down position to an upright position prior to final arming. After erecting the launcher tube, the self-righting mechanism stabilizes the submunition in the upright position while maintaining it coupled with the ground. The positioning mechanism then aims the launcher tube toward the target so that the sublet when fired will be launched over the target.

For the sublet to be successfully launched over the target, tracking and engagement techniques must be available that are capable of determining the bearing to the sensed target and range of the target in the first place so that proper aiming of the launcher tube and launching of the sublet can be achieved. To be effective such tracking and engagement techniques must demonstrate a high degree of accuracy, have sufficient range and be capable of operating in a wide variety of environmental and site conditions.

Heretofore, analog tracking techniques have been employed that use small microphone arrays for sensing the acoustic signature. These techniques have tracking ranges limited to less than 100 meters and are subject to a significant degree of tracking errors.

Digital tracking techniques that have been employed heretofore involve cross-correlation and beam-forming operations. These techniques require more processing capability in the system and/or very large array sizes in order to achieve a satisfactory level of accuracy and range.

Consequently, a need remains for improvements in tracking and engagement techniques for determining the bearing and range of a ground target in order to accurately aim a submunition toward the target at significant range.

SUMMARY OF THE INVENTION

The present invention provides a target tracking system designed to satisfy the aforementioned needs. The target tracking system of the present invention employs means for sensing acoustic energy and generating analog signals, means for conditioning the analog signals, and means for converting the analog signals to digital signals. These means are implemented by electronic hardware components. The digital signals are then processed in accordance with the steps of a sequence of minimum residual correlation and two-state kalman filter software algorithms executed by a digital signal processor to determine the bearing to the target, such as a ground vehicle, emitting the sensed acoustic energy.

More particularly, the means for sensing acoustic energy is an array of three microphones arranged at corners of an equilateral triangle. The processing carried out by the sequence of software algorithms is passive and based on the time difference of arrival at the three different microphones of the received acoustic wave emanating from the target, such as noise from an engine or other source of a vehicle. Since the acoustic wave appears planar at the three microphones, the bearing to the target can be determined trigonometrically from the time differences if they are accurately measured.

The minimum residual correlation software algorithm of the target tracking system, first, determines the time difference or delay of acoustic wave front arrival for each microphone pair by the residue correlation of the windowed data and curve fitting, second, translates the time delay for each microphone pair to target bearing through a trigonometric formula and look-up table, and, third, cosine weights together each bearing estimate from the three pairs of microphones to arrive at one raw bearing estimate which is periodically updated. Thus, the output of the minimum residual correlation software algorithm of the target tracking system is the raw azimuth estimate.

The two-state kalman filter software algorithm of the target tracking system receives the raw bearing estimate from the minimum residual correlation algorithm and filters or smooths it through the use of rate limiting and two-state linear kalman filter stages of the algorithm to arrive at the final output, a smoothed estimate of the bearing or azimuth of the target. The kalman filter generates an azimuth rate estimate along with the smoothed azimuth.

These and other features and advantages of the present invention will become more apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 3B is a general flow diagram of a software portion of the target tracking system of of the present invention.

FIG. 4 is a detailed block diagram of the hardware portion of the target tracking system of FIG. 3.

FIGS. 5 is a detailed flow diagram of a residue calculation section of a minimum residual correlation algorithm of the software portion of the tracking system of FIG. 3B.

FIGS. 7A and 7B taken together are a detailed flow diagram of a look-up table and cosine weighting section of the minimum residual correlation algorithm of the software portion of the tracking system of FIG. 3B.

FIGS. 8A and 8B taken together are a detailed flow diagram of a two-state kalman filter algorithm of the software portion of the tracking system of FIG. 3B.

DETAILED DESCRIPTION OF THE INVENTION

Sublet Launching Operations

Figure 1:
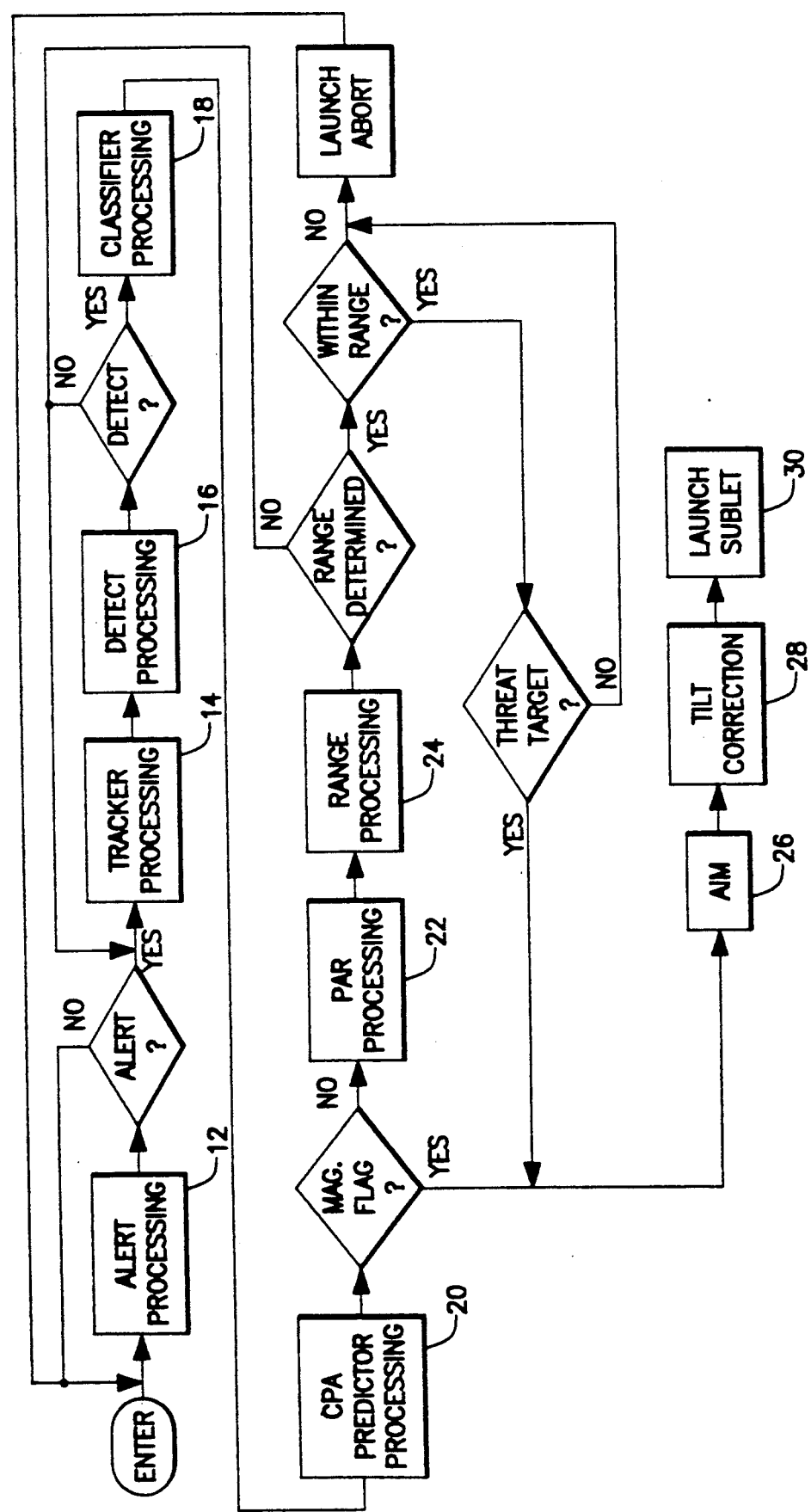
FIG. 1 is a flow diagram of the steps leading up to launching a sublet of a WAM submunition at a target, with the steps including a target tracking system of the present invention and a target engagement system of the cross-referenced invention.

Referring now to the drawings, and particularly to FIG. 1, there is illustrated a flow diagram 10 of the operations leading up to launching a sublet of a WAM submunition at a target. A target tracking system of the present invention and a target engagement system of the cross-referenced invention are parts of the operations of flow diagram 10.

Referring to the flow diagram 10 of FIG. 1, to initiate the operations leading to launching the sublet, a target T (FIG. 2) emitting an acoustic wave W (FIG. 2) must first be sensed, as represented by block 12, when the sensors are in an alert status. Next, tracking of the target T to determine its azimuth is performed, as represented by block 14, in accordance with the target tracking system of the present invention.

The confirmation that a valid target is being tracked and legitimate azimuth information is being processed is provided by detecting and classifying algorithms, as represented by blocks 16 and 18. Processing by a closest point of approach (CPA) predictor and passive acoustic ranger (PAR), as represented by blocks 20 and 22, precede initiation of range processing, as represented by block 24, being the subject of the cross-referenced invention. The range of the detected target leads to a decision to either authorize the initiation of launch or to abort launch. Initiation of launch begins with aiming of the sublet at the target, as represented by block 26, correcting the sublet for tilt if resting on an incline, as represented by block 28, and finally launching of the sublet, as represented by block 30.

Target Tracking System

Figure 2:
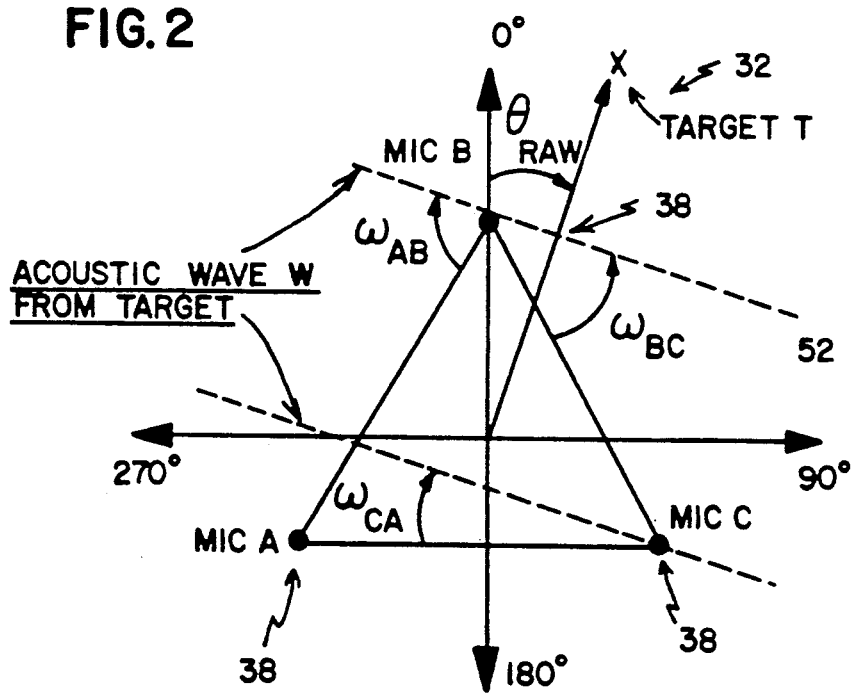
FIG. 2 is a diagram of the geometry of a three microphone array employed by the target tracking system of the present invention.
Figure 3A:
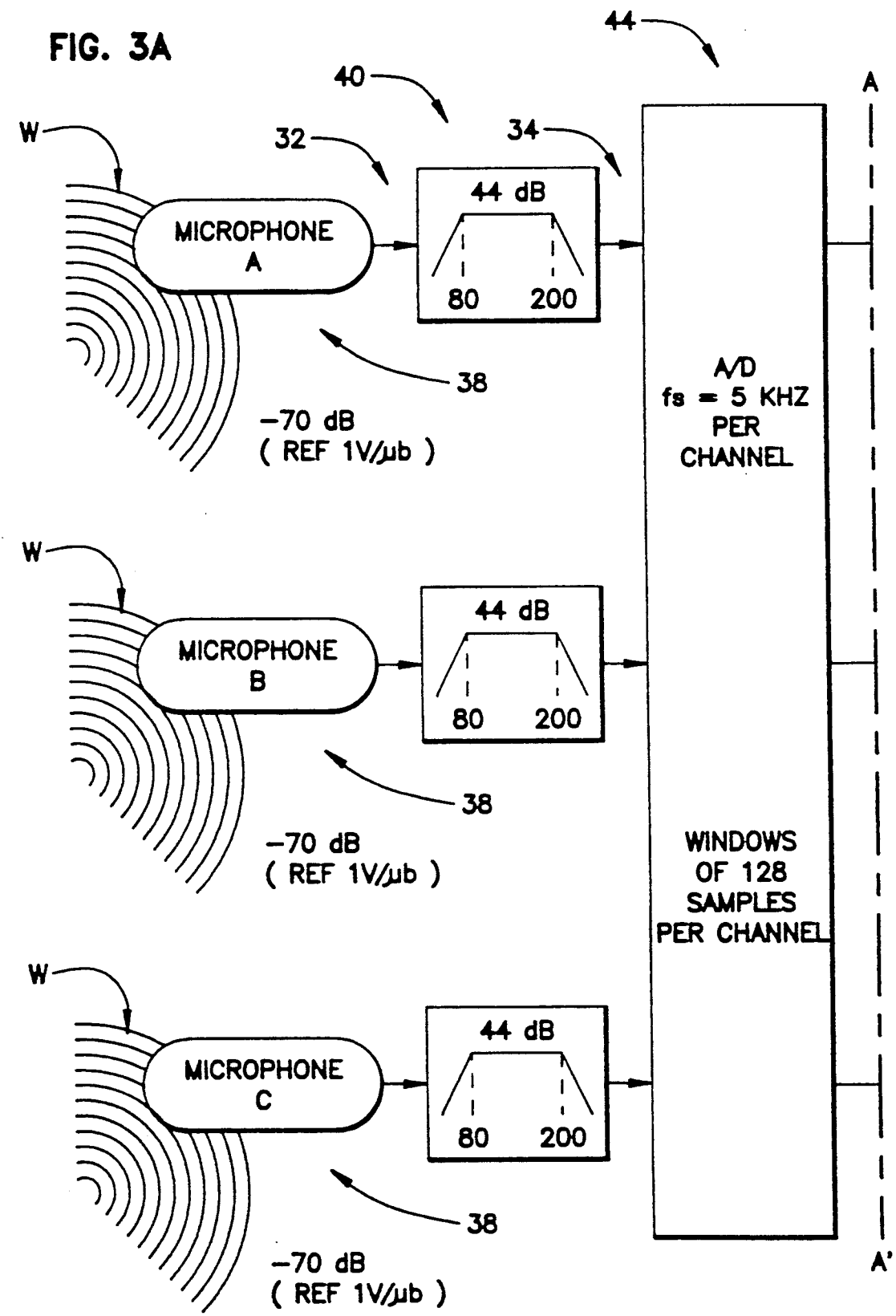
FIG. 3A is a general block diagram of a hardware portion of the target tracking system of the present invention.

Referring to FIGS. 2, 3A and 3B, there is illustrated the target tracking system 32 of the present invention. The target tracking system 32 basically includes a hardware portion 34 which includes the components of FIGS. 3A and 4 and a software portion 36 which includes the components of FIGS. 3B, 5, 6, 7A and 7B, and 8A and 8B. The hardware portion 34 employs means 38 for sensing acoustic energy and generating analog signals, means 40 for conditioning the analog signals, means 42 for sampling the signals and means 44 for converting the analog signals to digital signals. The digital signals are then processed by the software portion 36 in accordance with the steps of a sequence of minimum residual correlation and two-state kalman filter software algorithms 46 and 48 stored and executed by a digital computer 50 to determine the bearing or azimuth to the target T, such as a ground vehicle, emitting the sensed acoustic energy.

Referring to FIGS. 2 and 3A, the sensing means 38 is an array 52 of acoustic transducers in the form of three microphones A, B and C arranged at corners of an equilateral triangle. The three-microphone array 52 intercepts the acoustic energy wave W emitted from the target T. The three-microphone array 52 is operable for sensing the acoustic energy wave W and generating analog signals representative of the acoustic energy sensed.

The processing carried out by the sequence of algorithms of the software portion 36 of the target tracking system 32 is passive and based on the time difference of arrival at the three different microphones A, B and C of the received acoustic wave emanating from the target T. Since the acoustic wave appears planar at the three microphones A, B and C, the bearing or azimuth to the target T can be determined trigonometrically from the time differences if they are accurately measured.

Hardware Portion of Target Tracking System

Referring to FIGS. 3A and 4, after the microphones A, B and C of the sensing means 38 have transformed the acoustic wave to analog signals, the analog signals are first conditioned by the conditioning means 40 of the hardware portion 34 of the target tracking system 32. Preferably, the conditioning means 40 is composed of a serial arrangement of an acoustic preamplifier 54 and a bandpass filter 56 connected between each of the microphone A, B and C and one of a plurality of sample-and-hold units 58 of the sampling means 42. The sample-and-hold units 58 are connected to the converting means 44 which includes an analog-to-digital (A-to-D) converter unit 44. The conditioning means 40, sampling means 42 and converting means 44 are made up of components which are individually well-known to persons of ordinary skill in the art and thus need only be shown in block form. To illustrate these components in detail would not contribute to a better understanding of the invention but instead would only make the explanation of the invention more complex.

Each microphone analog output is simultaneously amplified and bandpass filtered (80–200 Hz) by the respective preamplifier 54 and bandpass filter 56. The microphone output is then sampled at 5 KHz by the sample-and-hold units 58 and windows of a preselected number of samples, such as 128, from each microphone A, B and C are formed and sequentially and repetitively transferred to the A-to-D converter unit 44 by a multiplexer 60 interposed between the outputs from the sample-and-hold units 58 and the inputs of the A-to-D converter unit 44. The digital output of the converter unit 44 is transmitted to a storage register 62 and therefrom to the digital computer 46.

Processing of the digital signals for determining the bearing to the ground object emitting the sensed acoustic energy is then carried out by the software portion 36 of the target tracking system 32. As mentioned previously, the software portion 36 comprises a sequence of minimum residual correlation and two-state kalman filter software algorithms 46, 48 stored and executed by the digital computer 50. By way of example, the digital computer 50 can be commercial equipment identified as a TMS320C25 Digital Signal Processor for storing and executing the minimum residual correlation algorithm 46 and a 68020 32-bit processor for storing and executing the two-state kalman filter algorithm 48.

Software Portion of Target Tracking System

Figure 6:
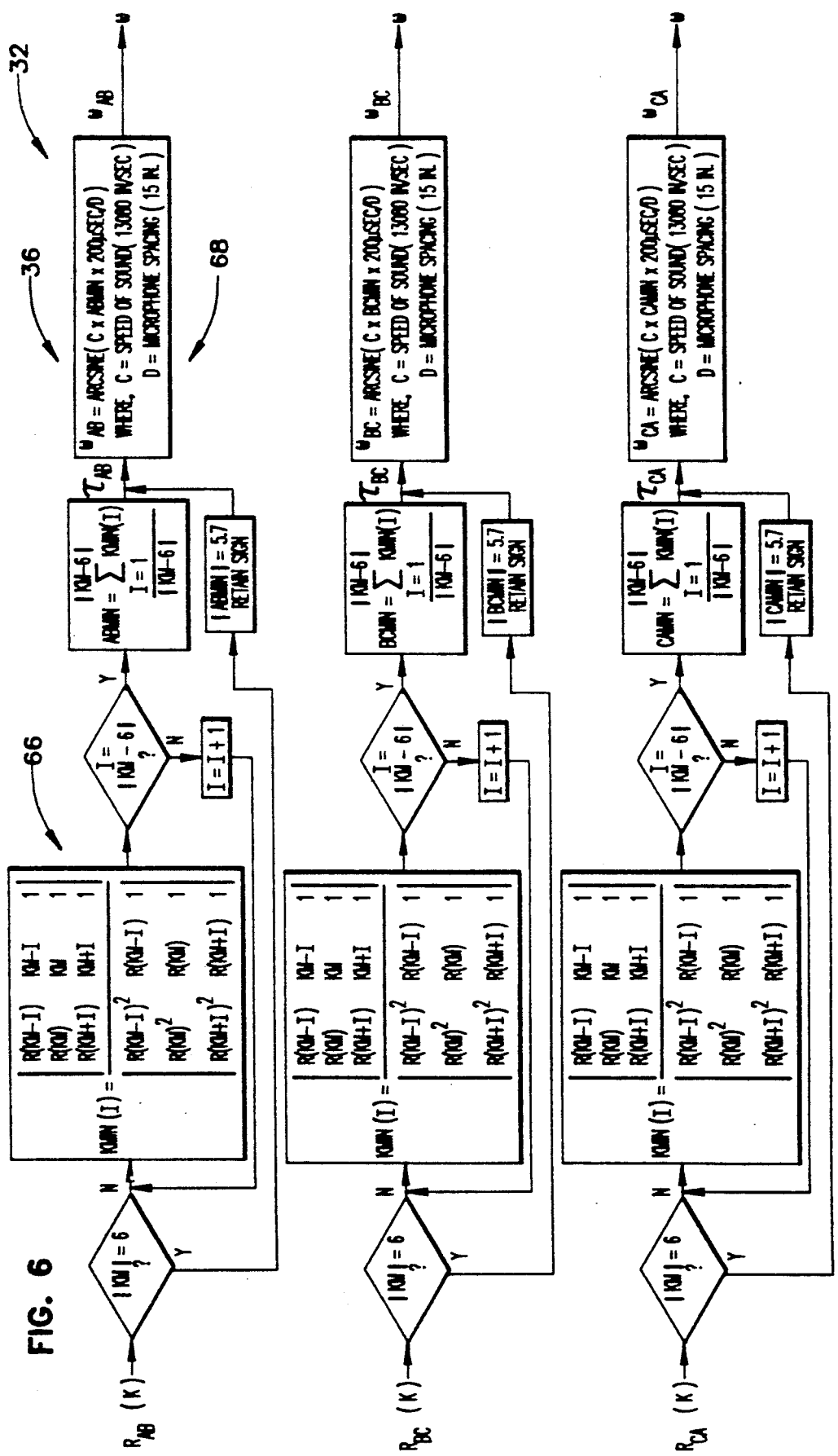
FIG. 6 is a detailed flow diagram of a curve fit and angle calculation section of the minimum residual correlation algorithm of the software portion of the tracking system of FIG. 3B.
Figure 7A:
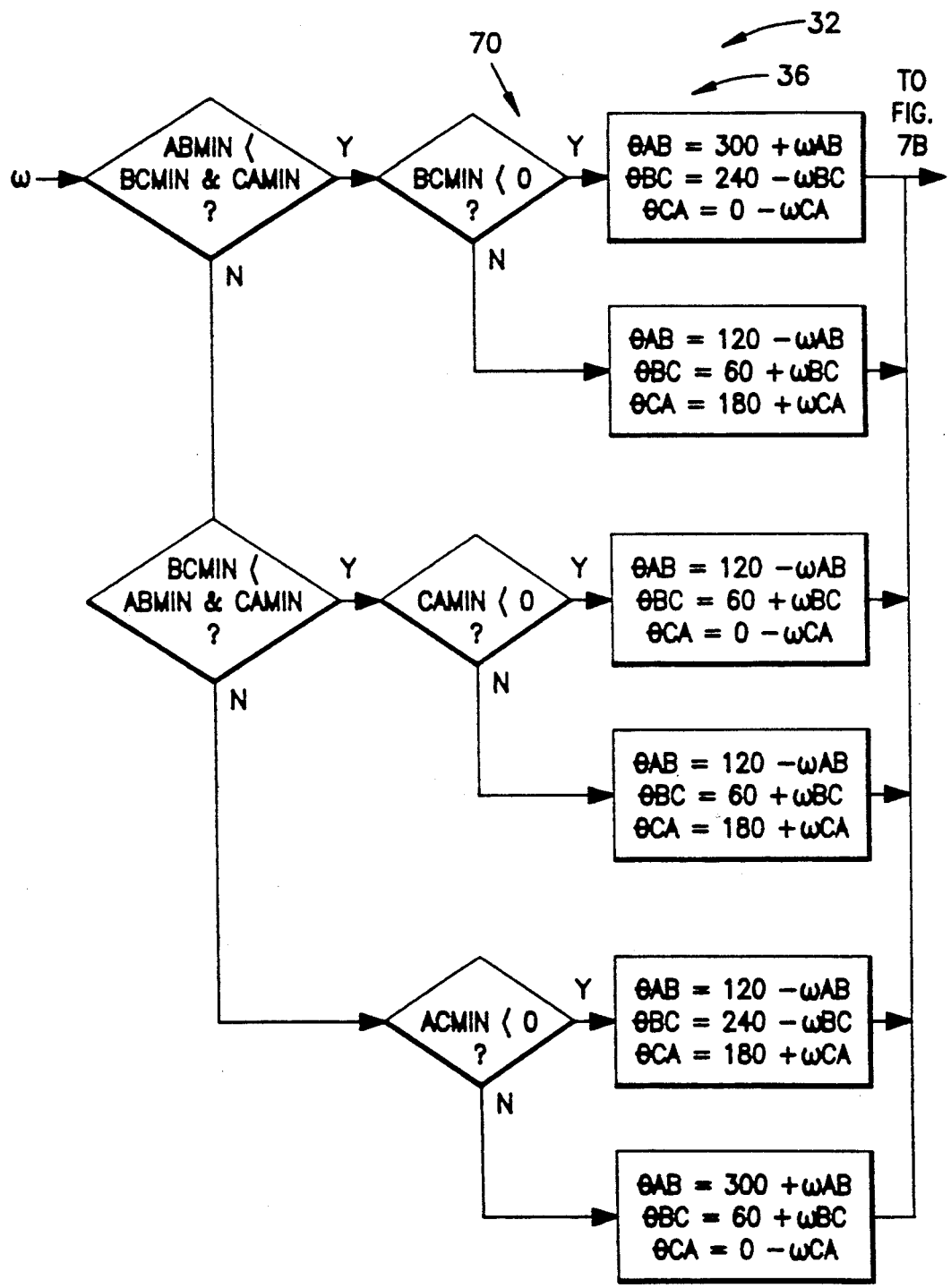

Referring to FIGS. 3B, 5, 6, 7A and 7B, there is illustrated respectively general and detailed flow diagrams of the minimum residual correlation software algorithm 46 of the target tracking system 32. FIGS. 3B and 5 depict a residue calculation section 64 of the minimum residual correlation algorithm 46. FIGS. 3B and 6 depicts a curve fit section 66 and angle calculation section 68 of the minimum residual correlation algorithm 46. FIGS. 3B, 7A and 7B depict a look-up table section 70 and cosine weighting section 72 of the minimum residual correlation algorithm 46.

The determination of target bearing or azimuth from acoustic signals is possible because of the physical properties of sound waves. An acoustic wave W emanating from a point source on a target T (such as a tank) several meters from the submunition to be launched can be assumed to be approximately planar. Because sound travels a fixed distance per unit time, an acoustic signal detected by two of three microphones arranged in an equilateral triangle are required to determined azimuth from 0° to 360°. As seen in FIG. 2, the planar acoustic wave W is traversing a three-microphone array 52. The angle between the acoustic wave W and the axis of any two microphones is the incidence angle ($L_{AB}$, $L_{BC}$, $L_{CA}$). Azimuth ($J_{raw}$) is measured from the center of the equilateral triangle and is perpendicular to the planar wave W. Each microphone pair (A,B; B,C; and C,A) has a unique acoustic delay related to target azimuth. The minimum residual correlation algorithm 46 estimates the delay for each microphone pair and calculates the corresponding target azimuth.

Referring to the residue calculation section 64 of the minimum residual correlation algorithm 46 of FIG. 3B, for each of the three pairs of microphones A,B; B,C; and C,A, residues $R_{AB}(k)$, $R_{BC}(k)$, and $R_{CA}(k)$ are calculated from the windowed data samples received from the hardware portion 34 of the target tracking system 32. These residues are calculated in accordance with the steps of the algorithm illustrated in detail in FIG. 5.

Referring to the curve fit section 66 and angle calculation section 68 of the minimum residual correlation algorithm 46 of FIG. 3B, for each of the residues $R_{AB}(k)$, $R_{BC}(k)$ and $R_{CA}(k)$ corresponding to each of the three pairs of microphones A,B; B,C; and C,A, a multiple parabolic curve fit is performed to each of the residues to arrive at delay estimates, $t_{AB}$, $t_{BC}$ and $t_{CA}$, for each pair. From each of the three delay estimates, angles of incidence, $L_{AB}$, $L_{BC}$, $L_{CA}$, are calculated for each of the three pairs of microphones. The delay estimates and angles of incidence are calculated in accordance with the steps of the algorithm illustrated in detail in FIG. 6.

Referring to the look-up table section 70 and cosine weighting section 72 of the minimum residual correlation algorithm 46 of FIG. 3B, each angle of incidence, $L_{AB}$, $L_{BC}$, $L_{CA}$, is converted into a corresponding azimuth estimate, $J_{AB}$, $J_{BC}$, $J_{CA}$, for each of the three pairs of microphones by accessing a look-up table stored in memory. The table is based on a division of the azimuth coordinate system into twelve 30° sectors, with microphone B in the direction of 0°. The table lists conversion equations which permit converting from an angle of incidence (L) to azimuth (J) for each microphone pair. The signs of all three delay values, the minimum, are required to resolve the correct azimuth estimate. This arises from the fact that for each angle of incidence, two azimuth estimates are possible. Thus, a corresponding azimuth estimate is derived from the look-up table for each microphone pair depending on the sector location of the target.

In the cosine weighting section 72, the three azimuth estimates are averaged to provide one final azimuth estimate (raw azimuth). Each estimate is weighted by a corresponding sensitivity function, which is the cosine squared of the angle of incidence for the respective microphone pair. The azimuth estimates for each microphone pair and the cosine weighting of the estimates are calculated in accordance with the steps of the algorithm illustrated in detail in FIGS. 7A and 7B.

In summary, in the minimum residual correlation algorithm 46, the time difference or delay (t) of acoustic wave front arrival for each microphone pair is determined by the residue correlation of the windowed data and curve fitting. the time delay for each microphone pair is translated to target bearing (J) through a trigonometric formula and look-up table and each bearing estimate from the three pairs of microphones are cosine weighted together to arrive at one raw bearing estimate ($J_{raw}$). A new estimate is available ever 15.6 milliseconds (40 Hz. update rate). Thus, the output of the minimum residual correlation software algorithm 46 of the target tracking system 32 is the raw azimuth ($J_{raw}$) estimate.

Figure 8A:
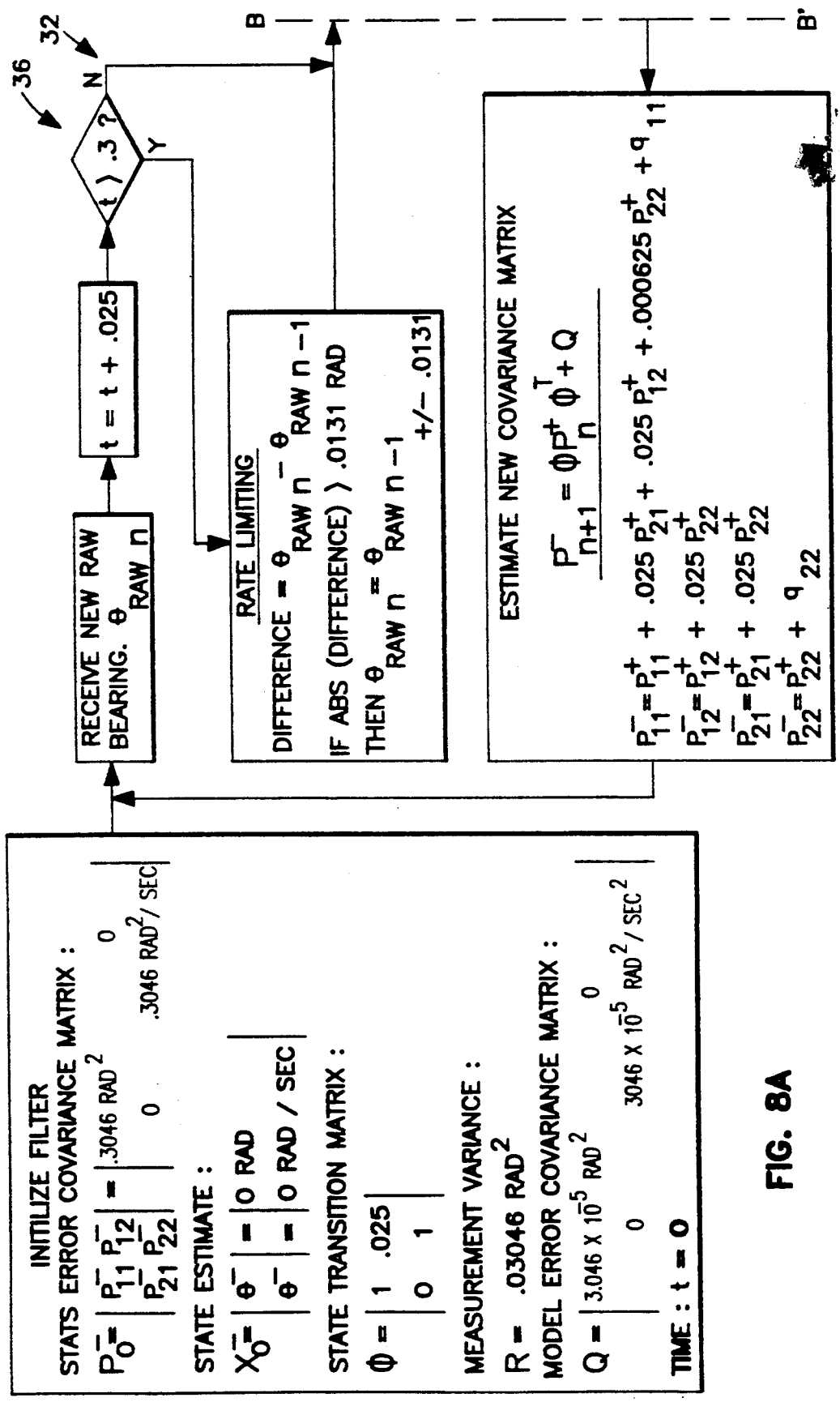

Referring to FIGS. 3B, 8A and 8B, there is illustrated respective general and detailed flow diagrams of the two-state kalman filter software algorithm 48 of the target tracking system 32. At the two-state kalman filter algorithm 48, the raw bearing estimate is filtered or smoothed through the use of rate limiting as per block 74 of FIG. 3B and a two-state linear kalman filter as per block 76 of FIG. 3B to arrive at the final output, a smoothed estimate of the bearing or azimuth of the target. The kalman filter generates an azimuth rate estimate along with the smoothed azimuth. A constant azimuth rate model, characteristic of an alpha-beta filter, is used. However, kalman gains are computed at each iteration to provide the optimum filtering for all phases of the trajectory, from initial convergence through steady state tracking.

The rate limiting and two-state linear kalman filter operations represented by blocks 74 and 76 of FIG. 3B are carried out in accordance with the steps of the two-state kalman filter software algorithm 48 illustrated in detail in FIGS. 8A and 8B.

The advantages of the target tracking system 32 are as follows: (1) it operates passively to provide target bearing; (2) it does not require "line of sight" to the target; (3) it operates in a wide variety of environmental and site conditions, unaffected by grass, trees, shrubbery or hills; (4) it has long range capability up to 750 meters for heavy tracked vehicles; (5) it has ten degree (1 sigma) accuracy; and (6) it inherently tracks the largest and closest vehicle in multiple vehicle situations.

Previous methods of passive acoustic tracking have used smaller microphone arrays and all analog processing. Tracking range was limited to less than 100 meters and tracking errors were much greater than with this digital tracking system. Other digital techniques including cross-correlation or beam-forming require more processing capability in the system and/or very large array sizes in order to achieve the same accuracy and range.

Target Engagement System

Figure 9:
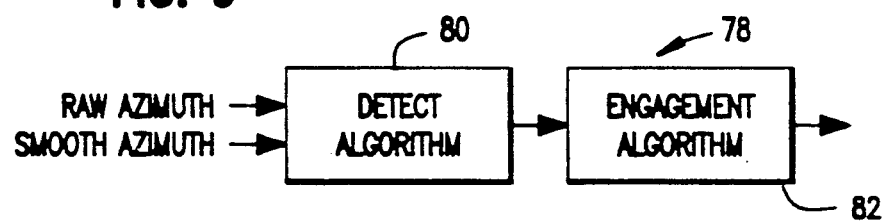
FIG. 9 is a general block diagram of a target engagement algorithm constituting the invention of the above cross-referenced application.
Figure 10:
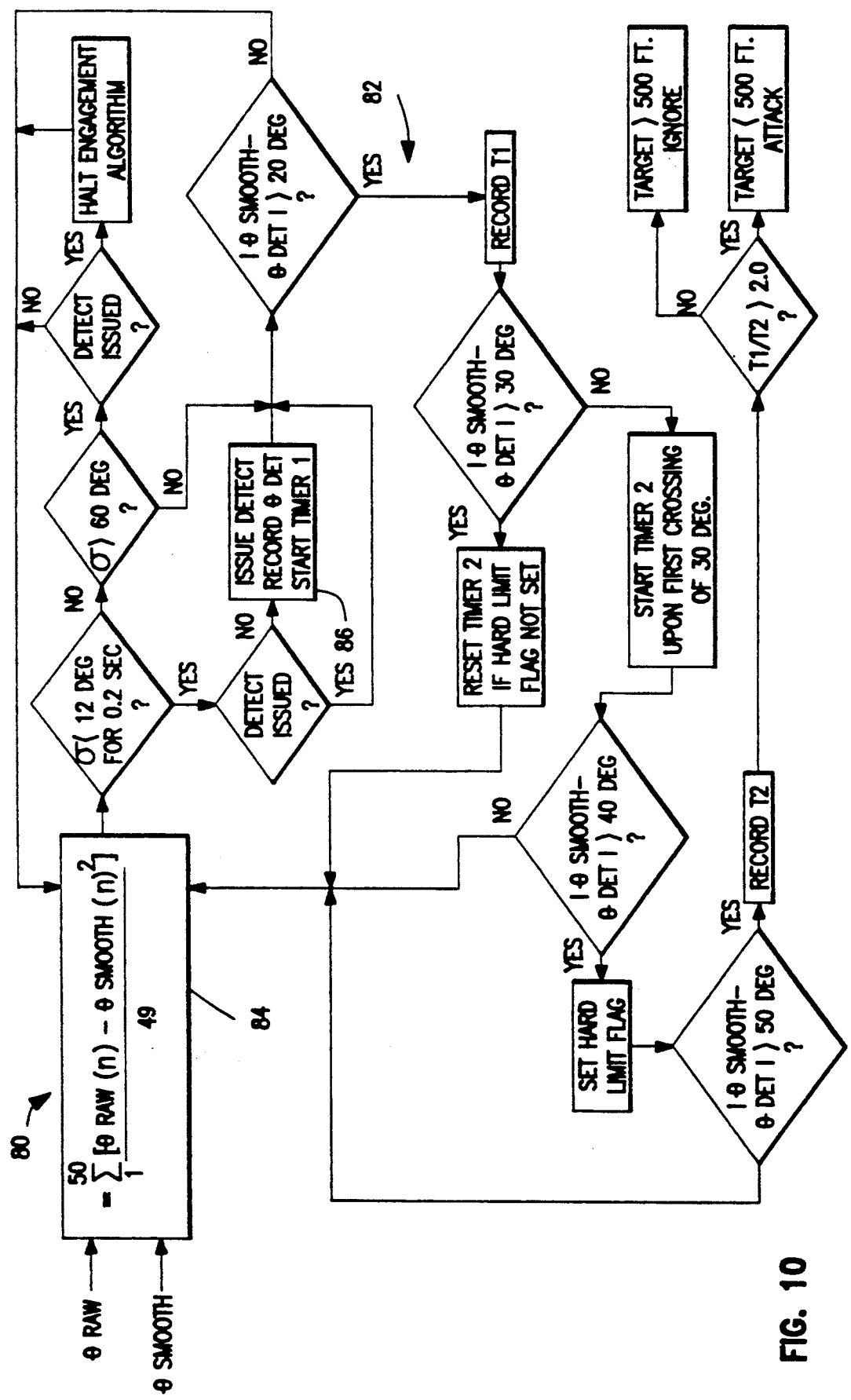
FIG. 10 is a detailed flow diagram of the target engagement algorithm of FIG. 9.

Referring to FIGS. 9 and 10, there is illustrated a target engagement system 78 constituting the invention of the above cross-referenced application. The target engagement system 78 is implemented in software and includes a detect algorithm 80 and an engagement (delta-theta ratio test) algorithm 82. The target engagement system 78 uses target motion analysis to determine a target engagement decision for ground targets, such as vehicles. The input to the system 78 is the target azimuth as a function of time. It analyzes target azimuth information without requiring target speed, heading, or range. Azimuth information is described herein as being provided from the target tracking system 32 of the present invention described above. Alternatively, such information can be provided by some other suitable system. In other words, use of the target engagement system 78 is not dependent upon use of the target tracking system 32.

Once the algorithms of the target tracking system 32 have been initiated, a detect must be issued at block 84 of the detect algorithm 80 to begin the sequence of the target engagement system 78. The detect algorithm 80 provides confirmation that a valid target is being tracked and legitimate azimuth information is being provided. This is accomplished by computing the standard deviation of the raw azimuth relative to the smooth azimuth. Thus, the detect algorithm 80 requires both raw and smooth azimuth readings as inputs, as seen in FIG. 9. The raw and smooth azimuth updates are generated b the target tracking system 32 of FIGS. 3A and 3B.

The standard deviation of the raw azimuth relative to the smooth azimuth is calculated as per block 84. Once the standard deviation decreases below 12° for 0.2 second, a detect is issued, initiating the engagement sequence. Typically, the standard deviation decreases when the raw azimuth estimate locks onto the target. However, during the engagement sequence, the detect is canceled and the operation of the engagement system 78 is halted, if at any subsequent time the standard deviation increases above 60° during any update.

Once a detect is issued by the detect algorithm 80 as a result of the calculation and testing of the standard deviation at block 84, the corresponding detect azimuth is recorded as per block 86 and the engagement algorithm 82 begins. The engagement algorithm 82 records the times (T1 and T2) it takes for the target to cross two sectors, each covering 20° and separate by 10°. The first sector covers 20° from a reference line corresponding to the detect azimuth. The second sector covers another 20° but is displaced from 30° to 50° relative to the reference line. Thus, time T1 is measured from detect (the reference line) to 20° after detect azimuth, and time T2 is measured from 30° after detect azimuth (the reference line) to 50° after detect azimuth.

The starting boundaries of the first and second sector and the ending boundary of the first sector will reset the corresponding timer (T1 and T2) if crossed by the current azimuth estimate. This tends to average out noisy azimuth updates. The starting boundary of second sector is hard-limited from resetting T2 if the azimuth estimate has changed by greater than 40° from detect azimuth. The time measurements end when the azimuth estimate first crosses the end of the second sector.

When T1 and T2 have been recorded the ratio of T1/T2 is calculated. If this ratio is greater than 2.0, then the target is estimated to be within approximately 500 feet and is subsequently attacked. Otherwise, the target is greater than 500 feet away and no action is taken.

The standard deviation of raw and smooth azimuth and the ratio of times (T1 and T2) are calculated in accordance with the steps of the algorithms of the system 7 illustrated in detail in the detailed flow diagram of FIG. 10.

The advantages of the target engagement system 78 are as follows: (1) it operates passively to provide target range containment; (2) it requires minimal processing, extensive spectral analysis not being used; (3) it is independent of target speed; (4) it does not require "line of sight" to the target; (5) it operates well in a wide variety of environmental conditions; (6) it automatically gives priority to heavy targets (i.e., a tank); (7) only target azimuth is required, the exact range not being used; (8) it determines engagement for extended ranges, such as greater than 500 feet; and (9) the target heading or closest point of approach is not required.

The range containment approach of the engagement system 78 uses azimuth updates from the target tracking system 32 of the present invention which uses acoustics as the influence. Other passive range containment approaches use other influences such as seismics or magnetics. Both of these approaches provide range containment for targets relatively close to the sensor. Other passive acoustic approaches contain extensive spectral analysis and/or training which requires significant processing power.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. A target tracking system, comprising:
   (a) means arrayed at corners of an equilateral triangle for sensing acoustic energy emitted by a target and received at said triangle corners and generating separate streams of analog signals representative of said acoustic energy sensed at said triangle corners;
   (b) means for receiving and converting said separate streams of analog signals to separate streams of digital signals;
   (c) means for receiving said separate streams of digital signals, performing a minimum residual correlation thereof and producing a raw azimuth signal of the target emitting the sensed acoustic energy; and
   (d) means for receiving said raw azimuth signal from said minimum residual correlation, performing a two-state kalman filtering thereof and producing a smoothed azimuth signal constituting the bearing to the target emitting the sensed acoustic energy.

2. The system of claim 1, wherein said sensing means includes three microphones arrayed respectively at said equilateral triangle corners.

3. The system of claim 1, further comprising:
means for receiving and conditioning said separate streams of analog signals and producing separate streams of conditioned analog signals therefrom, said converting means for receiving said separate streams of conditioned analog signals and converting said separate streams of conditioned analog signals to said separate streams of digital signals.

4. The system of claim 3, further comprising:
means for receiving and sampling said separate streams of conditioned analog signals being connected between said conditioning means and said converting means.

5. The system of claim 3, wherein said conditioning means includes an acoustic preamplifier and a bandpass filter connected in series between each of said sensing means and said converting means.

6. The system of claim 5, further comprising:
means for receiving and sampling said separate streams of conditioned analog signals being connected between said conditioning means and said converting means, said sampling means including a plurality of sample-and-hold units, one of said units connected in series with each of said filters.

7. The system of claim 6, wherein said converting means includes:
an analog-to-digital converter unit connected to each of said sample-and-hold units; and
means for storing said digital signals connected to said converter unit.

8. The system of claim 1, wherein said means for performing said minimum residual correlation includes:
means for receiving said separate streams of digital signals and determining and curve fitting the residues between the times of arrival of the acoustic energy at respective pairs of said sensing means to produce estimates of time delays between said pairs of sensing means.

9. The system of claim 8, wherein said means for performing said minimum residual correlation also includes:
means for receiving and translating the time delay estimates to target bearing estimates for said respective pairs of sensing means through performance of calculations in accordance with a trigonometric formula and by accessing values stored in a look-up table.

10. The system of claim 9, wherein said means for performing said minimum residual correlation further includes:
means for applying cosine weights together with each bearing estimates to arrive at a single raw bearing estimate to the target emitting the acoustic energy.

11. The system of claim 1, wherein said means for performing said two-state kalman filtering includes:
means for performing a rate limiting algorithm; and
means for performing two-state linear kalman filter algorithm to generate an azimuth rate estimate and a smoothed estimate of the azimuth of the target.

12. A target tracking system, comprising:

(a) three microphones arrayed respectively at corners of an equilateral triangle for sensing acoustic energy emitted by a target and received at said triangle corners and generating separate streams of analog signals representative of said acoustic energy sensed at said triangle corners;

(b) means connected to said microphones for receiving and conditioning said separate streams of analog signals and producing separate streams of conditioned analog signals therefrom;

(c) means connected to said conditioning means for receiving and sampling said separate streams of conditioned analog signals and producing separate streams of sampled analog signals therefrom;

(d) means connected to said sampling means for receiving and converting said separate streams of sampled analog signals to separate streams of sampled digital signals;

(e) means connected to said converting means receiving said separate streams of sampled digital signals, performing a minimum residual correlation thereof and producing a raw azimuth signal of the target emitting the sensed acoustic energy; and (f) means connecting to said minimum residual correlation performing means for receiving said raw azimuth signal from said minimum residual correlation, performing a two-state kalman filtering thereof and producing a smoothed azimuth signal constituting the azimuth of the target emitting the sensed acoustic energy.

13. The system of claim 12, wherein said conditioning means includes an acoustic preamplifier and a bandpass filter connected in series between each of said microphones and s id sampling means.

14. The system of claim 13, wherein said sampling means includes a plurality of sample-and-hold units, one of said units connected in series with each of said filters.

15. The system of claim 14, wherein said converting means includes:
an analog-to-digital converter unit connected to each of said sample-and-hold units; and
means for storing said digital signals connected to said converter unit.

16. The system of claim 12, wherein said means for performing said minimum residual correlation includes:
means for receiving said separate streams of digital signals and determining and curve fitting the residues between the times of arrival of the acoustic energy at respective pairs of said sensing means to produce estimates of time delays between said pairs of sensing means.

17. The system of claim 16, wherein said means for performing said minimum residual correlation also includes:
means for receiving and translating the time delay estimates to target bearing estimates for said respective pairs of sensing means through performance of calculations in accordance with a trigonometric formula and by accessing values stored in a look-up table.

18. The system of claim 17, wherein said means for performing said minimum residual correlation further includes:
means for applying cosine weights together with each bearing estimates to arrive at a single raw bearing estimate to the target emitting the acoustic energy.

19. The system of claim 12, wherein said means for performing said two-state kalman filtering includes:
 means for performing a rate limiting algorithm; and
 means for performing two-state linear kalman filter algorithm to generate an azimuth rate estimate and a smoothed estimate of the azimuth of the target.

20. A passive acoustic target tracking system, comprising:
 (a) three microphones arrayed respectively at corners of an equilateral triangle for sensing acoustic energy emitted by a target and generating separate streams of analog signals representative of the acoustic energy sensed at the triangle corners;
 (b) a hardware portion including means for receiving said separate streams of analog signals from said microphones and conditioning and converting said separate streams of analog signals from analog to digital form and outputting said separate streams as digital signals; and
 (c) a software portion including signal receiving means for receiving said separate streams of digital signals and azimuth determining means for determining the azimuth to the target emitting the sensed acoustic energy, wherein said azimuth determining means includes:
  (i) a minimum residual correlation algorithm which performs correlations on the separate streams of digital signals and produces a raw azimuth signal as a result of the correlations; and
  (ii) a two-state kalman filter algorithm which receives the raw azimuth signal, performs a two-state kalman filtering of the raw azimuth signal, and produces a smooth azimuth signal constituting the bearing to the target emitting the sensed acoustic energy.

21. A target tracking method, comprising the steps of:
 (a) sensing at corners of an equilateral triangle the arrival of acoustic energy emitted by a target and generating separate streams of analog signals representative of the acoustic energy sensed at the triangle corners;
 (b) converting the separate streams of analog signals to separate streams of digital signals;
 (c) performing a minimum residual correlation on the separate streams of digital signals and producing a raw azimuth signal of the target emitting the sensed acoustic energy; and
 (d) performing a two-state kalman filtering of the raw azimuth signal and producing a smoothed azimuth signal constituting the bearing to the target emitting the sensed acoustic energy.

22. The method of claim 21, further comprising the step of:
 conditioning the separate streams of analog signals and producing separate streams of conditioned analog signals therefrom prior to converting the separate streams of analog signals to separate streams of digital signals.

23. The method of claim 22, further comprising the step of:
 sampling the separate streams of conditioned analog signals prior to converting the separate streams of analog signals to separate streams of digital signals.

* * * * *

UNITED STATES PATENT AND TRADEMARK OFFICE
CERTIFICATE OF CORRECTION

PATENT NO. : 5,095,467
DATED : March 10, 1992
INVENTOR(S) : Olson et al.

It is certified that error appears in the above-identified patent and that said Letters Patent is hereby corrected as shown below:

Column 1,
After the patent title please insert --This invention was made with Government support under Contract No. DAAA21-87-C-0201 awarded by the Department of the Army. The Government has certain rights in this invention.--

Column 10, line 19 before "receiving" insert --for--.

Column 10, line 34 cancel "s id" and insert --said--.

Signed and Sealed this

Twenty-first Day of September, 1993

Attest:

BRUCE LEHMAN

*Attesting Officer*    *Commissioner of Patents and Trademarks*